US007218609B2

(12) United States Patent
Borella et al.

(10) Patent No.: US 7,218,609 B2
(45) Date of Patent: May 15, 2007

(54) METHOD AND SYSTEM OF TRANSFERRING SESSION SPEED AND STATE INFORMATION BETWEEN ACCESS AND HOME NETWORKS

(75) Inventors: Michael S. Borella, Naperville, IL (US); Chandra Warrier, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 1110 days.

(21) Appl. No.: 10/232,340

(22) Filed: Aug. 30, 2002

(65) Prior Publication Data
US 2004/0052238 A1   Mar. 18, 2004

(51) Int. Cl.
*H04J 1/16* (2006.01)
(52) U.S. Cl. ...................... 370/230; 370/328
(58) Field of Classification Search ............. 370/310.2, 370/328, 232, 235, 331, 230, 349
See application file for complete search history.

(56) References Cited

U.S. PATENT DOCUMENTS 6,332,075 B1 * 12/2001 Verdonk .................... 455/408
6,771,623 B2   8/2004 Ton ........................... 370/331
7,003,302 B2 * 2/2006 Yoshida et al. ............. 455/450

OTHER PUBLICATIONS

International Search Report, Oct. 12, 2004.
International Preliminary Examination Report, Dec. 23, 2004.

* cited by examiner

*Primary Examiner*—Brenda Pham
(74) *Attorney, Agent, or Firm*—McDonnell Boehnen Hulbert & Berghoff LLP (57) ABSTRACT

A method and system of transferring data rate and state information of mobile nodes between access and home networks is provided. A mobile node may register with a foreign agent on a foreign network, by sending mobile node information, such as a data rate at which the mobile node operates and a dormancy status of the mobile node, to a radio access network, which forwards the information to the foreign agent. The foreign agent may then contact a home agent on the mobile node's home network to setup a call. The foreign agent may send the mobile node information, such as the data rate or the dormancy state, to the home agent during call-setup or during the call as well.

23 Claims, 7 Drawing Sheets

| Mobile IP fixed header | Options | MN-HA authentication option | Options | MN-AAA authentication option | Data rate Parameter | FA-HA authentication Option |

| Mobile IP fixed header | Dormancy Parameter | FA-HA authentication option |

METHOD AND SYSTEM OF TRANSFERRING SESSION SPEED AND STATE INFORMATION BETWEEN ACCESS AND HOME NETWORKS

FIELD OF INVENTION

The present invention relates to wireless telecommunications and, more particularly, to a method and system of transferring data rate and state information of mobile nodes between access and home networks.

BACKGROUND

Wireless telecommunications can be divided into two broad categories; mobile wireless communications and fixed wireless communications. Each category has its own unique market in terms of customer needs and technology requirements. Mobile wireless communications requires non-tethered communications and typically allows roaming, i.e., the ability to provide service to a mobile node while the mobile node is outside it's home system. On the other hand, fixed wireless communications simply provide an alternative to wired communications or an alternative system of providing service. A fixed wireless device does not need mobility. Instead, the fixed wireless device needs cost effective telecommunications from fixed locations.

The Internet offers access to information sources worldwide and the increasing variety of wireless devices and wireless systems offering Internet protocol (IP) connectivity, such as personal digital assistants (PDAs) and cellular telephones, increases the ability to access the Internet. Fixed points of attachment to the Internet, such as fixed wireless connections, do not offer the flexibility afforded by mobile points of attachments to the Internet. The IP routes data packets of information for fixed points of attachment to their destinations according to IP addresses that are associated with a fixed network location much as a non-mobile telephone number is associated with a physical jack in a wall.

Mobile points of attachment, referred to as "mobile computing and networking," allow a user to change a wireless device's point of attachment to the Internet and not disrupt connectivity. Instead, a reconnection may occur essentially automatically and non-interactively. For example, in a wireless local area network (LAN) office environment, where the boundaries between attachment points are not sharp and are often invisible, a user may change points of attachment to the Internet substantially transparently. The mobile Internet protocol (Mobile IP) allows mobile nodes to transparently move between different IP networks and receive IP data packets accordingly. The mobile node is assigned to a particular network or home network and is also assigned a static IP address or home address associated with this home network. The mobile node may communicate with the home network through a device referred to as a "home agent." The mobile node may move to another network or foreign network and register with the foreign network through a device referred to as a "foreign agent." The foreign agent may assign a care-of address that is unique to that point of attachment.

In mobile IP, the home address is static and is used, for instance, to identify transmission control protocol (TCP) connections. The care-of address changes at each new point of attachment and can be thought of as the mobile node's topologically significant address. The care-of address identifies the mobile node's point of attachment with respect to the overall network topology.

The home address makes it appear that the mobile node is continually able to receive data on its home network through the home agent. Whenever the mobile node is not attached to its home network, the mobile node is attached to a foreign network and registered to a foreign agent. The mobile node may then communicate with its home network through the foreign network. Whenever the mobile node moves, it registers its new care-of address (i.e., point of attachment) with its home agent.

The home agent typically maintains a mobility binding record (MBR) for each mobile node. The MBR is used to keep track of mobile communications information such as a home address of the mobile node on the home network, a care-of address for the mobile node on a foreign network, and a lifetime timer for the association between the home address and the care-of address. Similarly, the foreign agent may maintain communication records of mobile nodes. For example, the foreign agent typically maintains records indicating assignment of care-of-addresses for visiting mobile nodes.

In addition, the foreign agent may have access to additional information that the home agent does not have access. This information may be useful for the home agent, especially if applications reside on the home network rather than the foreign network.

SUMMARY

In an exemplary embodiment, a method of transferring information between an access network and a home network is provided. The method may be performed in a network that has a mobile node in communication through an access network with a home network. The method may include sending mobile node information from the access network to the home network. The mobile node information may at least comprise information selected from the group consisting of a data rate at which the mobile node operates and a dormancy parameter indicating whether the mobile node is active or dormant.

In another respect, the exemplary embodiment may take the form of a method of transferring session speed and state information between access and home networks. The method may comprise receiving at an access network, data rate and dormancy parameters of a mobile node. The method may also include receiving at the access network, a first registration request from the mobile node and responsively sending a second registration request form the access network to a home network. The second registration request may at least comprise the data rate or dormancy parameters of the mobile node.

In still another respect, the exemplary embodiment may take the form of an access network. The access network may comprise an input interface that receives messages from a mobile node, and a proxy registration agent that generates and sends to a home network a proxy registration message. The proxy registration message may at least comprise information selected from the group consisting of a data rate at which the mobile node operates and a dormancy-parameter indicating whether the mobile node is active or dormant.

In still a further respect, the exemplary embodiment may take the form of a method for assigning home agents in a mobile Internet Protocol (IP) network. The method may include receiving at an access network, data rate and dormancy parameters of a mobile node and sending a proxy registration request from the access network to a home agent control node. The proxy registration request may at least comprise information selected from the group consisting of the data rate and dormancy parameters of the mobile node. The method may further include the home agent control node assigning a home agent from a plurality of home agents in the mobile IP network to the mobile node based at least in part on the mobile node information.

These as well as other features and advantages will become apparent to those of ordinary skill in the art by reading the following detailed description, with appropriate reference to the accompanying drawings.

BRIEF DESCRIPTION OF FIGURES

Reference is made to the attached figures, wherein like reference numerals represent like elements, and wherein.

DETAILED DESCRIPTION OF EXEMPLARY EMBODIMENTS

Figure 1:
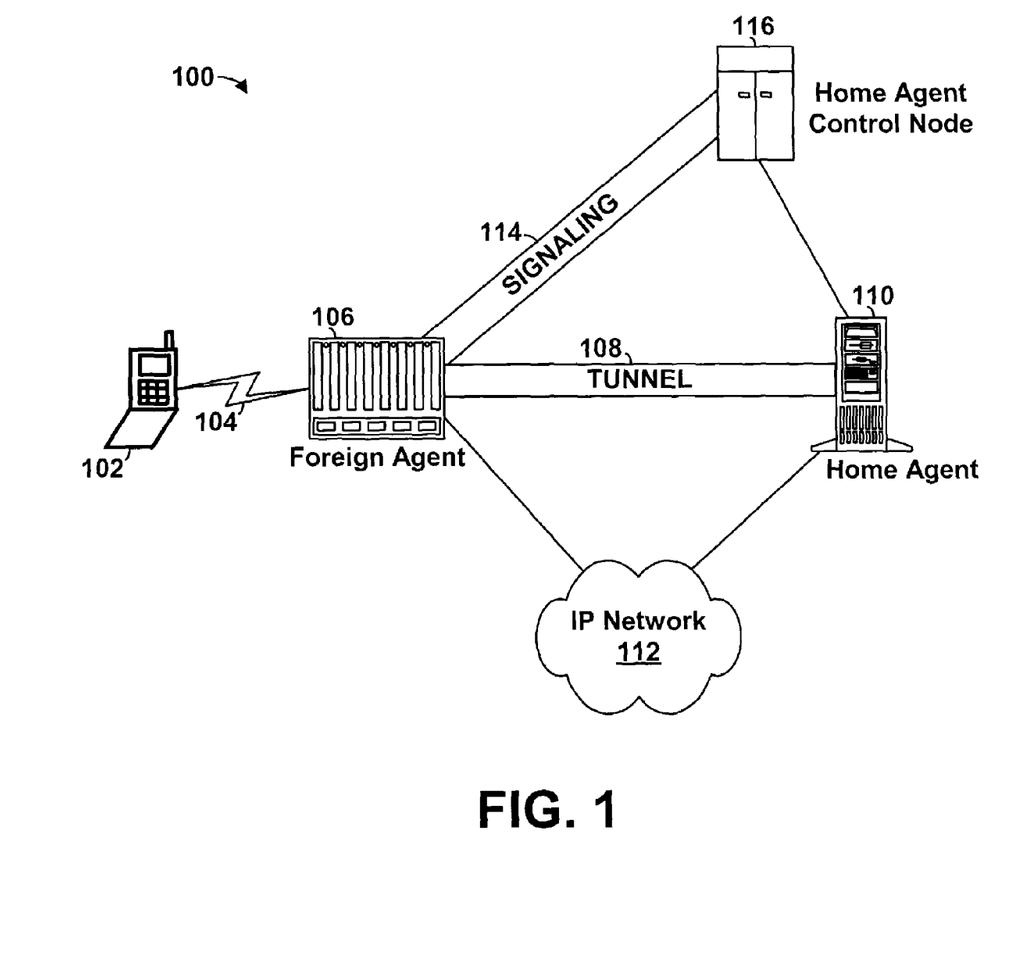
FIG. 1 is a block diagram illustrating one embodiment of a network.

Referring now to the figures, and more particularly to FIG. 1, one embodiment of a network 100 is illustrated. It should be understood that the network 100 illustrated in FIG. 1 and other arrangements described herein are set forth for purposes of example only, and other arrangements and elements can be used instead and some elements may be omitted altogether, depending on manufacturing and/or consumer preferences.

By way of example, the network 100 includes a mobile node 102 in communication via an interface 104 with a foreign agent 106. The foreign agent 106 couples via a tunneling interface 108 to a home agent 110. Both the foreign agent 106 and the home agent 110 couple to an Internet Protocol (IP) network 112. The foreign agent 106 also couples via a signaling interface 114 to a home agent control node 116, which is in turn coupled to the home agent 110. More or fewer components may also be implemented in the network 100. Each of the couplings of the network 100 may be an interface such as a trunk level 1 (T1) line, an Ethernet line, a signaling link, or others (whether wired or wireless connections).

Mobile nodes such as cellular telephones, personal digital assistants (PDA), wireless modems, or other mobile nodes may be used in the network 100. More or fewer mobile nodes than illustrated may be present in the network 100.

The interface 104 may comprise multiple network entities. For example, the interface 104 may comprise a radio access network (RAN). An RAN may include a base transceiver station (BTS) (or any other wireless access point) coupled to either a base station controller (BSC) or a packet control function (PCF). The mobile node 102 can communicate via an air interface to the BTS, which may connect to the BSC or PCF via a wired link. The BSC or PCF may then couple to the foreign agent 106 over a generic route encapsulation (GRE) tunnel such as a radio-packet (R-P) interface. (For more information on GRE see request for comments (RFCs) 1701–1702, the full disclosures of which are incorporated herein by reference). The R-P interface may comprise an A-10 interface, which is used to transfer data by encapsulating data into GRE packets, and an A-11 interface, which defines signaling procedures for managing A-10 connections. (A-11 messages are based on mobile IP registration messages as defined in the Telecommunications Industry Association/Electronics Industries Alliance/Interim Standard 2001 (TIA/EIA/IS-2001), the full disclosure of which is incorporated herein by reference).

The foreign agent 106 may function as an access network for the mobile node 102 to the IP network 112. The foreign agent 106 may be a packet data service node (PDSN), or other network devices. (The mobile node 102 may even perform as its own foreign agent if the MS obtains authorization from the foreign agent 106). The foreign agent 106 may provide access to the Internet, intranets, and wireless application protocol (WAP) servers for the mobile node 102. The foreign agent 106 may also assign an IP address to the mobile node 102. The mobile node 102 may communicate to the home agent 110 through the foreign agent 106.

Figure 2:
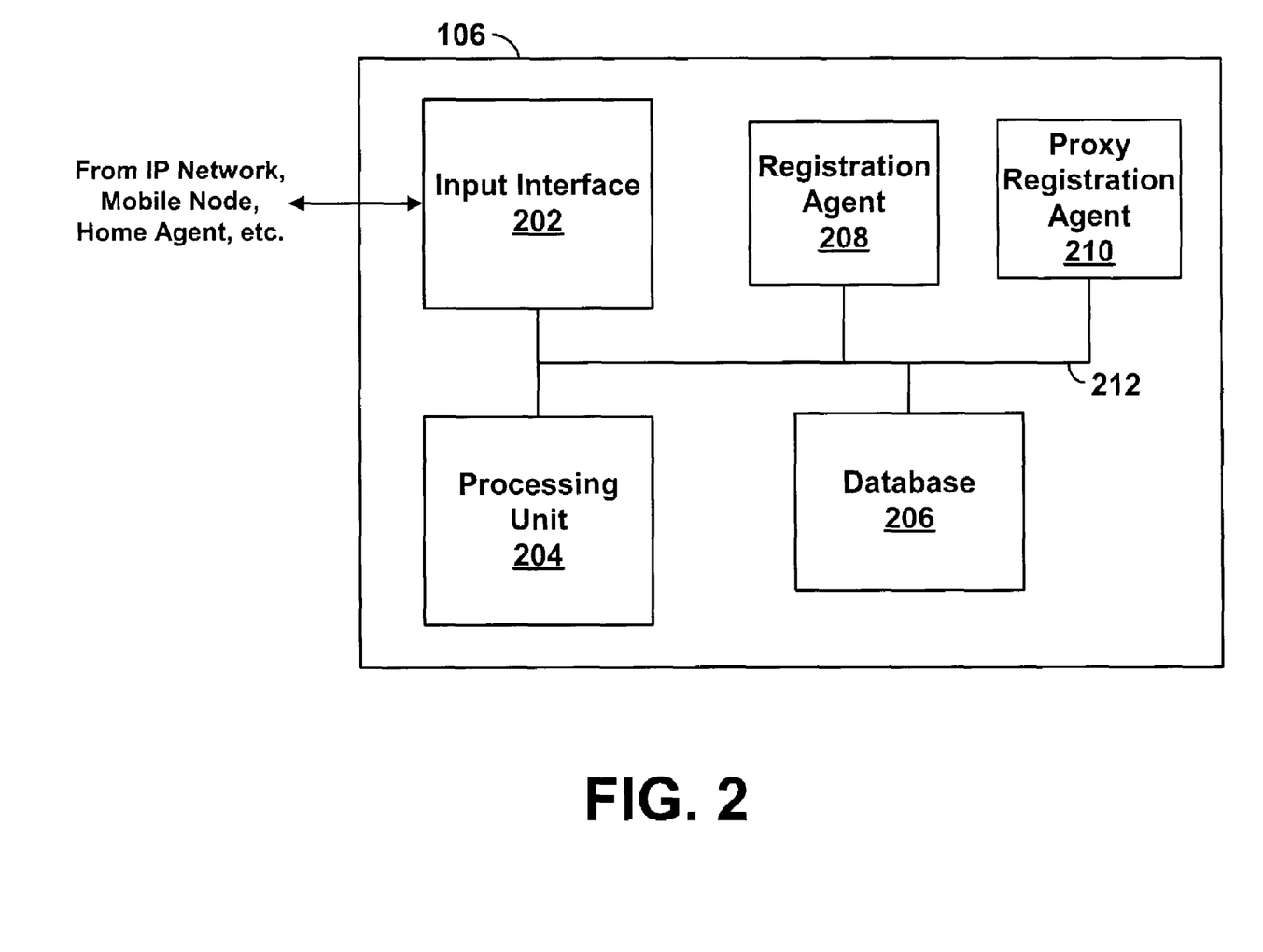
FIG. 2 is a block diagram illustrating one embodiment of an access network.

FIG. 2 is a block diagram illustrating one embodiment of the foreign agent 106. The foreign agent 106 may include an input interface 202, a processing unit 204, a registration agent 206, a proxy registration agent 208, and a database 210 all connected through a bus 212. The foreign agent 106 may function as an access network within the network 100.

The input interface 202 may receive signals from the mobile node 102, from the IP network 112, from the home agent 110, or from the home agent control node 116. Therefore, the input interface 202 may be a wired interface such as a port connected to a base station or any other wireless access point. Or, the input interface 202 may be a packet switched network interface to allow the foreign agent 106 to connect to data networks, such as the IP network 112. The input interface 202 may operate bi-directionally in order to receive signals into the foreign agent 106 and send signals out of the foreign agent 106.

The processing unit 204 may include a programmable digital signal processing engine or an application specific integrated circuit (ASIC), which may execute machine language instructions, for example, to allocate care-of addresses to mobile nodes. The processing unit 204 may also include one or more high-speed central processing units (CPU). The processing unit 204 may execute machine language instructions provided with software using object-oriented machine language instructions, such as the C++ programming language. However, other programming languages (such as the C or Java programming languages for instance) could be used as well.

The database 206 may include main memory and secondary storage. The main memory can be high-speed random access memory (RAM), or some other high-speed memory device or memory circuitry. And secondary storage may include persistent long-term storage, such as read only memory (ROM), optical or magnetic disks, or any other volatile or non-volatile storage system. Those skilled in the art will recognize that the database 206 can comprise a combination of alternative components. The database 206 may store care-of addresses in use by mobile nodes and care-of addresses that are free for allocation to mobile nodes.

The registration agent 208 may function to send notification or advertisement messages to the mobile node 102 in order to register the mobile node 102 with the foreign agent 106. The proxy registration agent 210 may function to send registration messages as well, as will be described below. The registration agent 208 and the proxy registration agent 210 may be processing units and may also comprise one integral entity.

Referring back to FIG. 1, the home agent 110 may function as a home network for the mobile node 102 and/or may provide connectivity to the mobile node's home network. The home agent 110 tracks the mobile node 102 and forwards the mobile node's 102 subscriber data to the foreign agent 106. The home agent 110 may be any Internet service provider (ISP), private network, or other network. The home agent 110 may also function as an authentication, authorization, and accounting (AAA) server, to verify that the mobile node 102 is a valid subscriber and possibly track usage for billing purposes. Furthermore, the home agent 110 may function as a Remote Authentication Dial In User Service (RADIUS) client as described in RFC 2865, the full disclosure of which is incorporated herein by reference.

The IP network 112 may be any local area network (LAN), wide-area network (WAN), or other data network that at least uses packet switching techniques, in order to provide wide-scale data connectivity.

The tunneling interface 108 and the signaling interface 114 may be IP-IP and/or IP-GRE-IP interfaces. The interfaces 108 and 114 may allow data packets to be sent from the home agent 110 to the foreign agent 106 and subsequently to the mobile node 102 using the home and care-of addresses of the mobile node 102. The home agent 110 may intercept IP data packets sent to the mobile node's 102 home address from devices connected to the IP network 112. The home agent 110 may inform other nodes on the network 100 that data packets for the mobile node 102 should be delivered to the home agent 110. The home agent 110 may forward data packets for the mobile node 102 to the mobile node's care-of address. The data packets may be encapsulated into GRE packets prior to sending them. However, other forms of data encapsulation may also be used.

The home agent control node 116 may monitor multiple home agents. For example, although only one home agent is illustrated in FIG. 1, multiple home agents may be connected to the home agent control node 116 and the home agent control node 116 may then monitor signaling through the multiple home agents. The home agent control node 116 is an optional network entity that may be omitted if desired.

The network 100 may operate according to mobile IP, which allows mobile nodes to transparently move between different IP sub-networks ("subnets") by dynamically changing their network connectivity. For more information on mobile IP see RFCs 2002–2006, the full disclosures of which are incorporated herein by reference.

In operation, the mobile node 102 firsts initiates communication with the network 100 through the foreign agent 106 by using the interface 104 to begin a call setup. For example, assuming the interface 104 is an RAN, the mobile node 102 contacts the BTS, which contacts the PCF. The PCF then contacts the foreign agent 106. When the mobile node 102 contacts the RAN, the mobile node 102 sends call-specific or service option information to the RAN. The call-specific information may include a data rate of the mobile node 102 (or an indication of a data rate of the mobile node 102), such as 1×RTT (one radio channel radio transmission technology), which transmit at speeds of 144 Kbps or 1×EVDO (one radio channel evolution data only), which transmits up to speeds of 2.4 Mbps (downstream only). The mobile node 102 may transfer other mobile node information to the RAN as well, such as an operating status of the mobile node 102, for instance.

The mobile node 102 may listen for mobile IP "agent advertisement" messages from foreign agents, such as foreign agent 106 or others not illustrated in FIG. 1, in order to begin communication with a foreign agent. The registration agent 208 within the foreign agent 106 may send the agent advertisement messages through the interface 104 to the mobile node 102. Home agents and foreign agents typically broadcast agent advertisements at regular intervals for example, once a second or once every few seconds. If the mobile node 102 needs to obtain a care-of address and does not wish to wait for the periodic advertisement, the mobile node 102 can broadcast or multicast a solicitation that will be answered by any foreign agent or home agent that receives it. Home agents may even use agent advertisements to make themselves known, even if they do not offer any care-of addresses.

An agent advertisement may list one or more available care-of addresses, inform the mobile node 102 about special features provided by foreign agents, for example, alternative data packet encapsulation techniques, and inform the mobile node 102 whether the agent is a home agent, a foreign agent, or both, and therefore whether the mobile node 102 is on its home network or a foreign network.

When the mobile node 102 receives an agent advertisement message from the foreign agent 106 indicating that it is now within the foreign agent's 106 subnet, the mobile node 102 registers with this foreign agent 106 and obtains a care-of address from the database 206 of the foreign agent 106. The mobile node 102 and/or the foreign agent 106 then sends a registration request to the home agent 110 to inform the home agent 110 of the care-of address and to indicate that the mobile node 102 has roamed away from its initial home subnet (i.e., the home agent's 110 network). The registration request may be sent by the registration agent 208 of the foreign agent 106 through the signaling interface 108 within a signaling path of the network 100.

The registration request may comprise a network access identifier (NAI) (e.g., user@domain.com) of the mobile node 102, the mobile node's 102 care-of address, and authentication information. Authentication information may be necessary because the home agent 100 should be certain that the registration request was originated by the mobile node 102 and not by some other malicious node pretending to be the mobile node 102.

When the home agent 110 receives the registration request, the home agent 110 may add information from the registration request to a routing table and the home agent 110 may approve the registration request and send a registration reply back to the foreign agent 106 and the mobile node 102. When the home agent 110 accepts the request, the home agent 110 associates the home address of the mobile node 102 with the care-of address of the mobile node 102, and maintains this association until a lifetime of the registration expires. The lifetime of the registration refers to an amount of time that the care-of address is valid for the mobile node 102. The foreign agent 106 may be able to limit registration lifetimes to a configurable value that the foreign agent 106 may include in its agent advertisements. The home agent 110 may be able to reduce the registration lifetime, which the home agent 110 may include as part of the registration reply.

The home address, care-of address, and registration lifetime all together are referred to as a binding for the mobile node 102. And thus a registration request can be considered to be a binding update of the mobile node 102.

If at some point the mobile node 102 can no longer detect advertisements from the foreign agent 106 that previously had offered a care-of address to the mobile node 102, the mobile node 102 may presume that foreign agent 106 is no longer within range of wireless communication with the mobile node 102. In this situation, the mobile node 102 has "roamed" out of range of the foreign agent 106 and should begin to search for a new care-of address, or possibly use a care-of address known from advertisements it is still receiving. The mobile node 102 may choose to wait for another advertisement if it has not received any recently advertised care-of addresses, or the mobile node 102 may send an agent solicitation. The mobile node 102 may then receive a new point of contact with another foreign agent and the mobile node 102 and/or the foreign agent 106 may again send a registration request to the home agent 110 to indicate this new point of contact.

In an exemplary embodiment, the foreign agent 106 may also send additional information to the home agent 110. For example, the foreign agent 106 may send a registration request that includes the data rate of the mobile node 102 to the home agent 100. However, the additional information may be sent to the home agent 110 within other messages rather than the registration request. In addition, other information may be sent, such as a dormancy parameter or an identifier indicating a type of the call like a voice call, a voice over IP (VoIP) call, or others. The foreign agent 106 may send information to the home agent 110 using a mobile IP extension. For a more complete understanding of mobile IP extensions, reference is made to RFC 2002, the full disclosures of which are incorporated herein by reference. A mobile IP extension may use a type-length-value (TLV) format.

As an example, the data rate parameter may be sent from the foreign agent 106 to the home agent 110 to indicate the effective data rate of the mobile node 102. (The foreign agent 106 knows the data rate because it is sent in a service option from the RAN. The RAN may initially receive from the mobile node 102 its operating data rate, and may continually receive status parameters). The data rate parameter may have a length of 1 byte and a value of 33, where 33 indicates a service option corresponding to 444 Kbps (1×RTT). Other data rate service options may also be used, such as service option 59, which corresponds to 2 Mbps (1×EVDO). Also, the data rate parameter may have any length other than that of 1 byte.

As another example, a dormancy parameter may also be sent from the foreign agent 106 to the home agent 110 to indicate the status of the mobile node 102. Again, the foreign agent 106 may know the dormancy status of the mobile node 102 because it can be sent in an update message from the RAN within the interface 104. A dormancy parameter may indicate the dormancy state of the mobile node 102. A mobile node can either be active (using a traffic channel) or dormant (not using a traffic channel). Mobiles that are idle for a period of time may automatically become dormant, and will be undormanted when either they have data to send or data is sent to them. In other words, a dormant mobile node relinquishes its traffic channel and does not send or receive data packets. The mobile node may listen to the paging channel however, and may be responsive to user commands. (Thus, if the mobile node is paged on the paging channel or the user requests access to the network, the device may come out of dormancy and re-establish a traffic channel). The dormancy parameter may have a length of 1 byte and a value of 0 if the mobile node is not dormant or a value of 1 is the mobile node is dormant, for example. Other examples are possible as well.

The dormancy information may be used within a virtual presence server that resides on within the network 100. For example, the network 100 may include an instant messaging server, which may use the dormancy information of the mobile node 102 to indicate whether a user of the mobile node 102 is "online" (i.e., undormant) or "away" (i.e., dormant).

The data rate and dormancy parameters may be inserted into or appended onto a message sent from the foreign agent 106 to the home agent 110 within the signaling path (i.e., call setup or teardown). For example, the data rate and dormancy parameters may be inserted into the mobile IP registration request. The proxy registration agent 210 may append the data rate, dormancy parameters, and other mobile node information onto a message in order to generate a proxy registration message. The proxy registration agent 210 may then send the proxy registration message to the home agent 110.

Figure 3A:
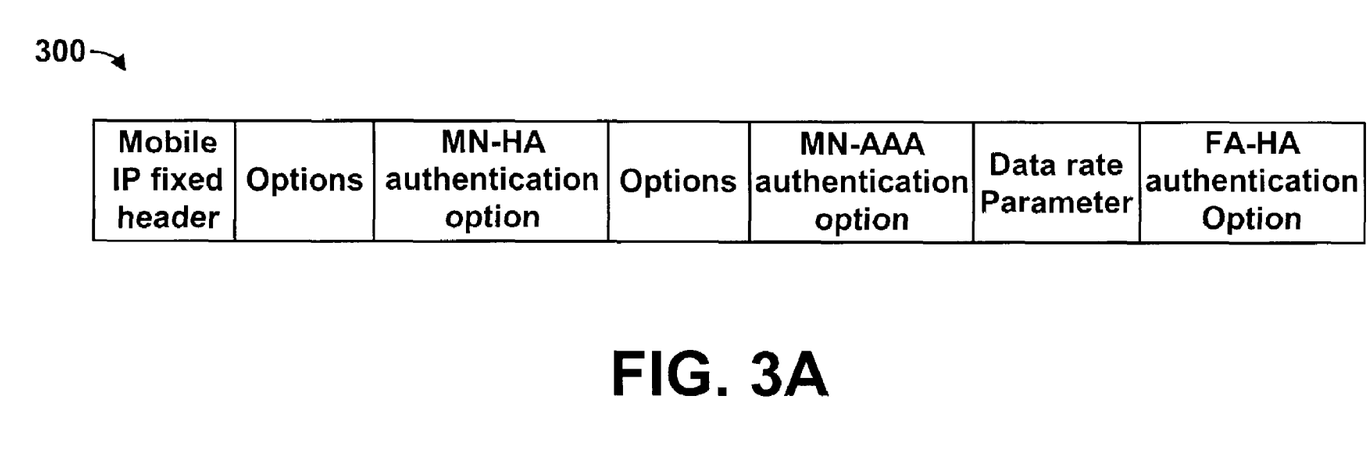
FIGS. 3A–3B illustrate embodiments of a data packet format.

FIG. 3A illustrates one embodiment of a format of a data packet message 300. The data packet message 300 may be a registration request, a proxy registration message or any other message. The data packet message 300 may include a mobile IP fixed header (as specified in RFC 2002–2006), a number of options like an NAI, an MN-HA (mobile node-home agent) authentication option, more options (e.g., registration information), an MN-AAA (mobile node-AAA) authentication option, the data rate parameter, and an FA-HA (foreign agent-home agent) authentication option. The data rate parameter may be placed in the mobile IP registration request after all attributes that are protected by the MN-HA and MN-AAA authentication options. The data packet message 300 may include more or less parameters than are illustrated in FIG. 3A and also may contain any number of bits and/or layers.

Figure 3B:
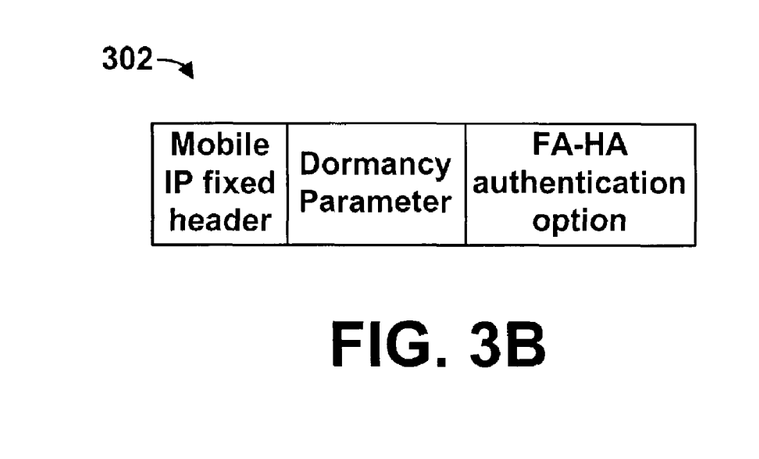

FIG. 3B illustrates another embodiment of a format of a data packet message 302. The data packet message 302 may include a mobile IP fixed header, a dormancy parameter, and an FA-HA authentication option. The data packet message 302 may include more or less parameters or options than are illustrated in FIG. 3B and may contain any number of bits and/or layers.

The data packet messages 300 and 302 may be any size and may include different information depending on when the data packet messages 300 and 302 are sent. For instance, if the data packet messages 300 and/or 302 are sent during call-setup, then the data packet messages 300 and/or 302 may be larger to include additional authentication and/or network address information of the mobile node 102. However, if the data packet messages 300 and/or 302 are sent during a call, then the data packet messages 300 and/or 302 may only include parameters of the mobile node 102 in order to update this information for the home agent 110, since registration information may be unnecessary once the call is already set-up.

Figure 4:
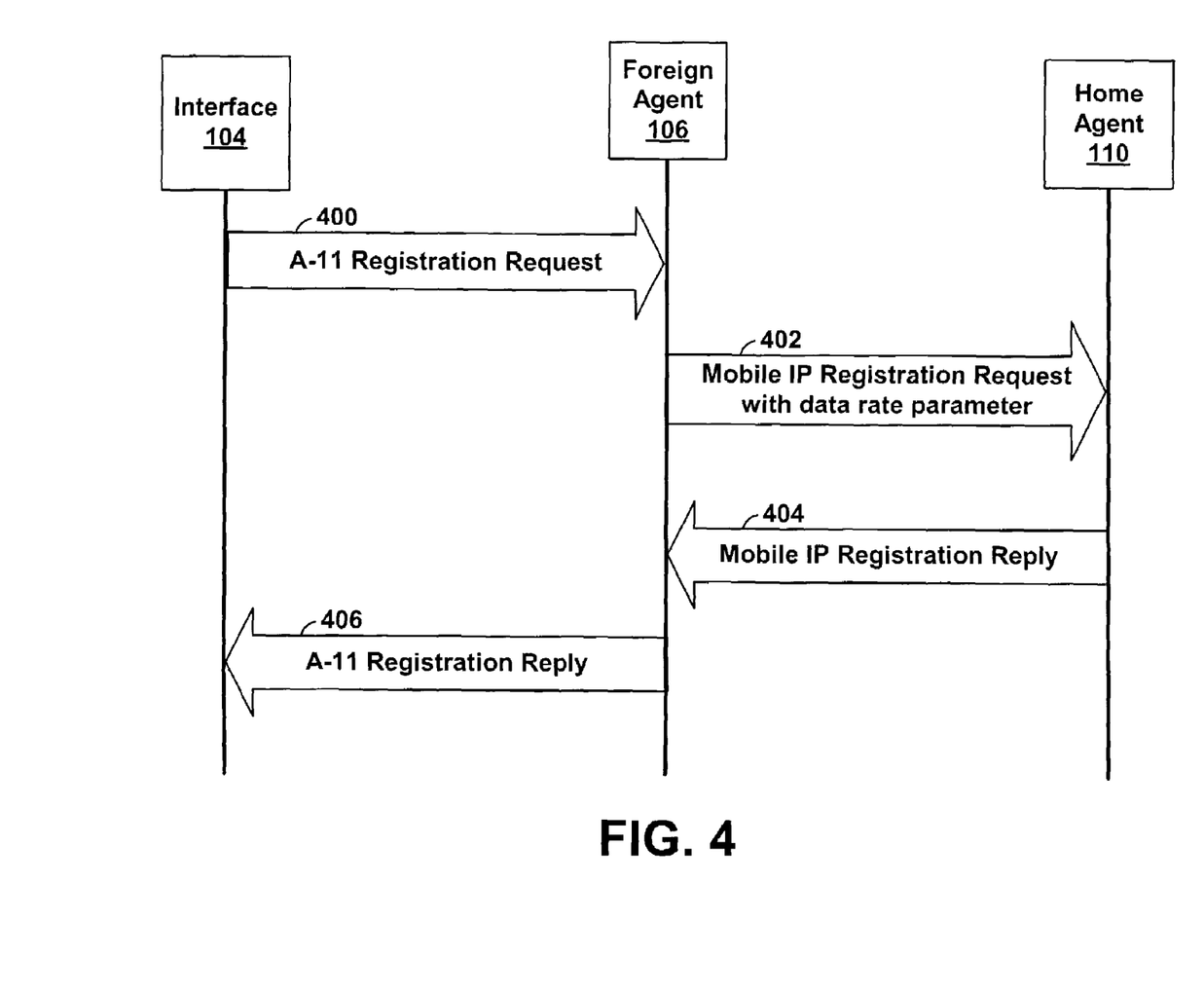
FIG. 4 is a message flow diagram illustrating one embodiment of transferring messages within the network illustrated in FIG. 1.

The data packet messages 300 and/or 302 may be sent from the foreign agent 106 to the home agent 110 using existing mobile IP messages, such as for example a mobile IP registration request. FIG. 4 is a message flow diagram illustrating one embodiment of transferring messages within the network 100. The messages illustrated in FIG. 4 may be sent to indicate the operating data rate of the mobile node 102. Initially, an entity of the interface 104 may send an A-11 registration request message 400 to the foreign agent 106. The foreign agent 106 may then send a mobile IP registration request message 402 to the home agent 110. The message 402 may include the data rate parameter indicating the data rate of the mobile node 102. The home agent 110 may send a mobile IP registration reply message 404 back to the foreign agent 106, which may send an A-11 registration reply message 406 to the interface 104.

Figure 5:
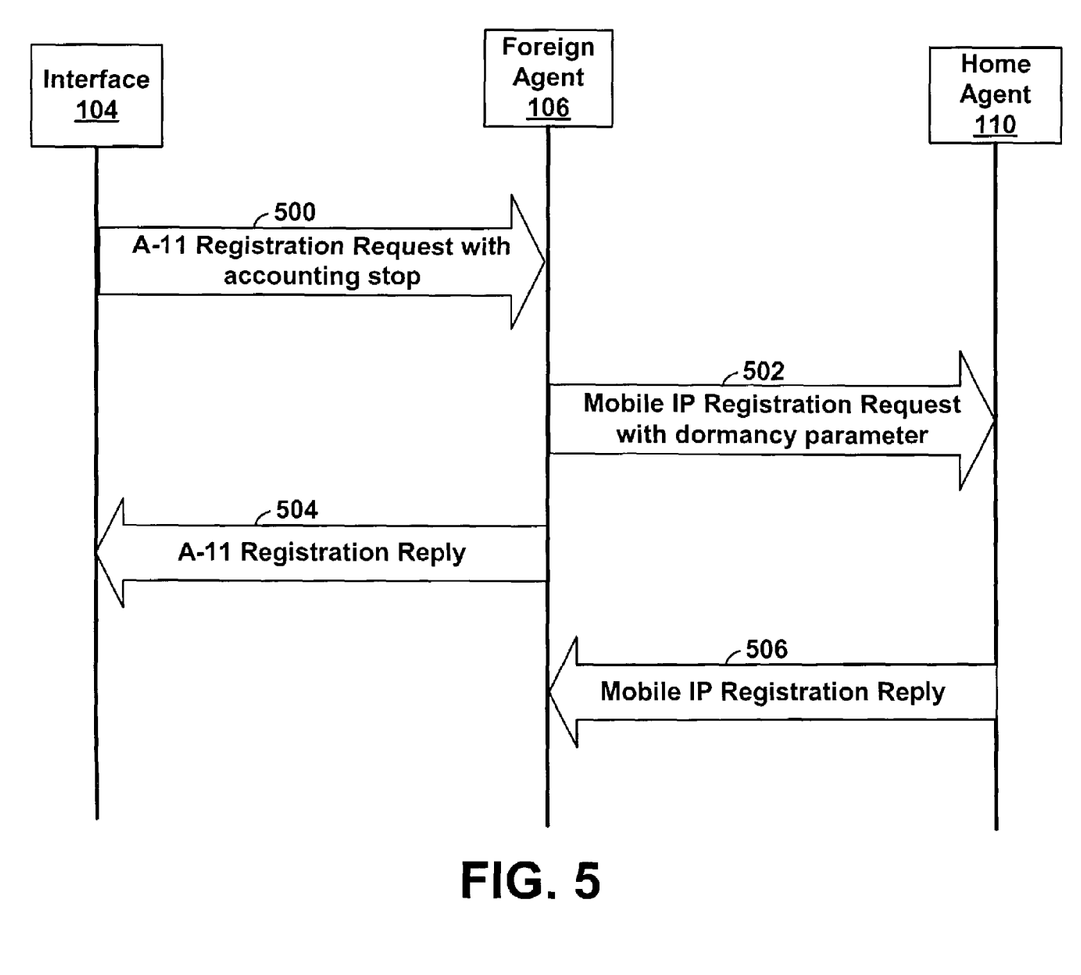
FIG. 5 is a message flow diagram illustrating another embodiment of transferring messages within the network illustrated in FIG. 1.

FIG. 5 is a message flow diagram illustrating another embodiment of transferring messages within the network 100. The messages illustrated in FIG. 5 may be sent to indicate that the mobile node 102 has become dormant, for example. When the mobile node 102 goes dormant, the foreign agent 106 may receive an A-11 registration request message 500 from the PCF of the RAN that comprises the interface 104. The A-11 registration request message 500 may indicate to the foreign agent 106 an "accounting stop," which may be used for billing purposes. The accounting stop indicates that the mobile node 102 is dormant and is no longer using services of the network 100, therefore the mobile node 102 may not be charged a fee while it is dormant. The foreign agent 106 may then generate a mobile IP registration request message 502 that includes the dormancy parameter set to dormant, and send the message 502 to the home agent 110.

The foreign agent 106 may also send an A-11 registration reply message 504 to the PCF of the interface 104, which forwards this information to the mobile node 102. The A-11 registration reply message 504 may be sent to acknowledge reception of the request from the RAN. Also, possibly at the same time, the home agent 110 may send a mobile IP registration reply message 506 to foreign agent 106 in reply to message 502. Since the foreign agent 106 sent the registration request message 502 on behalf of the mobile node 102, the foreign agent 106 may not forward the registration reply message 506 to the mobile node 102. In a sense, the foreign agent 106 may proxy mobile IP messages for the mobile node 102 in order to transfer information, such as the dormancy state of the mobile node 102, to the home agent 110.

Figure 6:
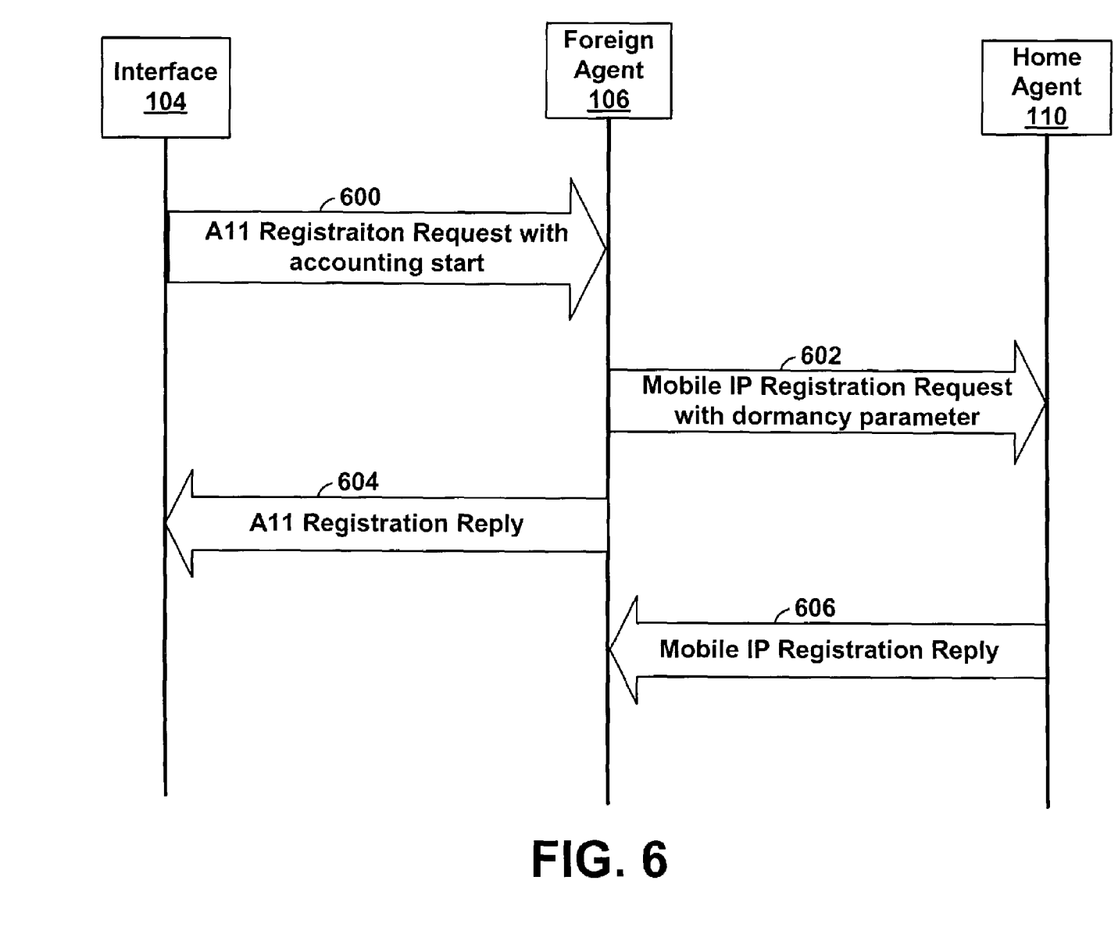
FIG. 6 is a message flow diagram illustrating still another embodiment of transferring messages within the network illustrated in FIG. 1.

FIG. 6 is a message flow diagram illustrating another embodiment of transferring messages within the network 100. The messages illustrated in FIG. 6 may be sent to indicate that the mobile node 102 has become undormant, for example. When the mobile node 102 becomes active, the foreign agent 106 may receive an A-11 registration request message 600 from the PCF of the RAN that comprises the interface 104. The A-11 registration request message 600 may indicate to the foreign agent 106 an "accounting start," which may be used for billing purposes. The accounting start indicates that the mobile node 102 is active and is using services of the network 100. The foreign agent 106 may then generate a mobile IP registration request message 602 that includes the dormancy parameter set to undormant, and send the message 602 to the home agent 110.

Again, the foreign agent 106 may be sending the registration request message 602 on behalf of the mobile node 102, and therefore the foreign agent 106 may send a proxy A-11 registration reply message 604 to the interface 104. Also, the foreign agent 106 may not forward the mobile IP registration reply message 606 to the mobile node 102.

The registration request messages that contain the dormancy parameters may also include an NAI and/or an IP address of the mobile node 102 in order to indicate to the home agent 110 which mobile node 102 of the network 100 is dormant or undormant.

The message flow diagrams illustrated in FIGS. 4–6 may illustrate signaling during a call-setup, or during a call as well. Therefore, the foreign agent 106 and the home agent 110 may always need to be prepared to send and accept registration requests because of repeat registrations that may be sent to update information of the mobile node, such as for example, to indicate the dormancy of the mobile node 102. Additionally, the foreign agent 106 may be instructed to periodically send mobile node 102 information containing either the data rate or dormancy parameters to the home agent 110.

The data rate parameter may only need to be included in a registration request sent during call setup (because it may not change). However, if the mobile node 102 is operating according to a changing data rate, then a registration request may be sent each time the data rate is changed. In addition, the dormancy parameter can be sent in a registration request at any time to indicate activity or non-activity of the mobile node 102 or whenever the mobile node 102 changes status from active to non-active or vice-versa.

As mentioned, the mobile node information, e.g., the data rate, dormancy parameters, etc., can be sent from the RAN to the foreign agent 106 using an A-11 registration request as illustrated in FIGS. 4–6. In this manner, the foreign agent 106 may receive this information and generate a mobile IP registration request on behalf of the mobile node 102 (i.e., a proxy registration request), that contains the necessary mobile node information, and send this request to the home agent 110. Therefore, the foreign agent 106 may at any time send a registration request to the home agent 110 indicating, for example, the dormancy state of the mobile node 102, regardless of whether the mobile node 102 prompts the foreign agent 106 to do so. This proxy registration request may be smaller in length than a non-proxy registration request used for call-setup since less information may be sent at this time.

The foreign agent 106 may calculate a lifetime of the parameters in the registration request. The lifetime may be an amount of time that the parameters are valid. The foreign agent 106 may send a refresh registration request message without the mobile node 102 initiating the request, once the lifetime expires. This may be accomplished in order to start a new lifetime. Alternatively, the mobile node 102 may at any time initiate a registration request.

Figure 7:
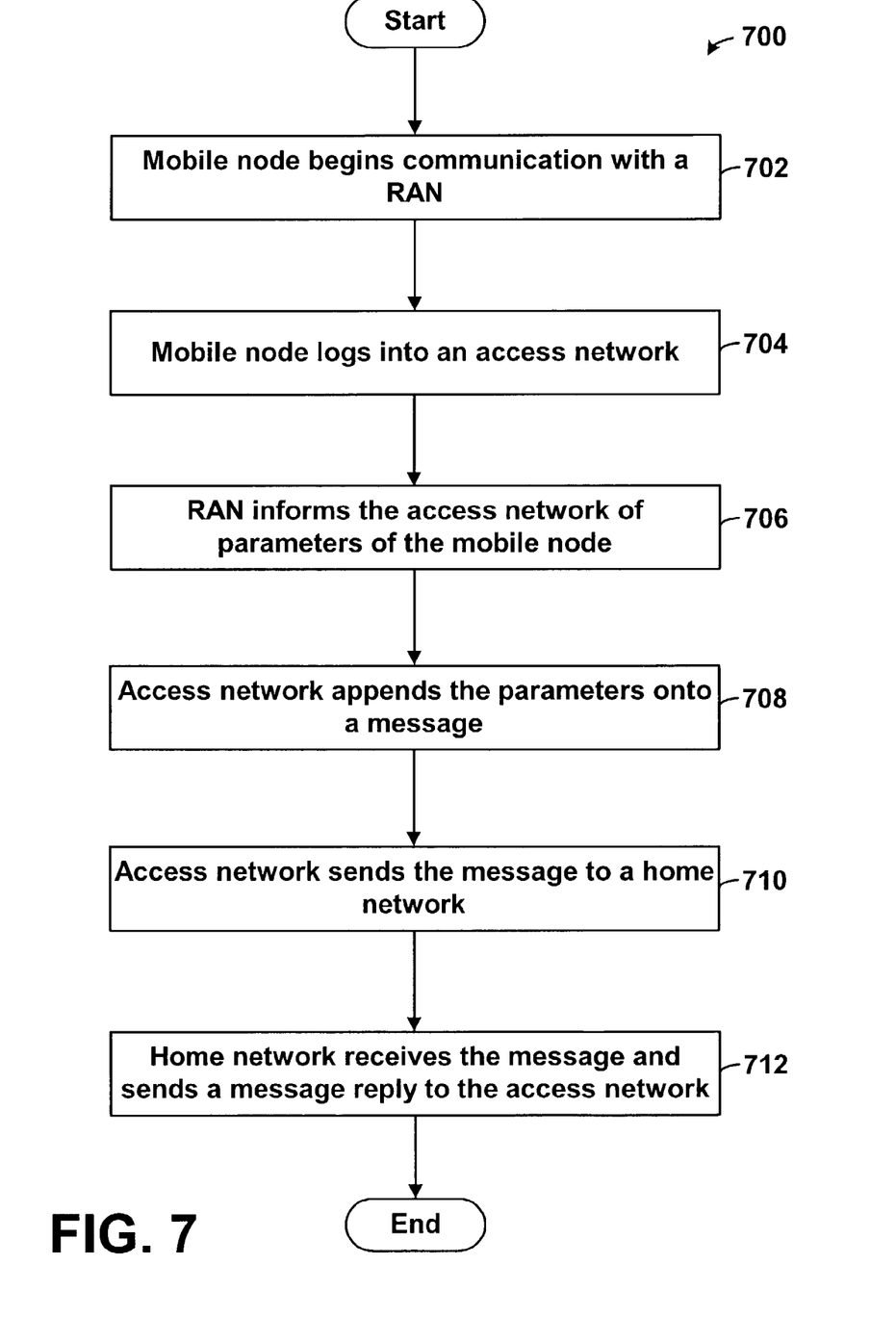
FIG. 7 depicts one embodiment of functional blocks of the network illustrated in FIG. 1.

FIG. 7 depicts one embodiment of a method 700 of transferring session speed and state information between access and home networks. A mobile node (such as mobile node 102) may begin communication with an RAN (i.e., interface 104), as shown at block 702. The mobile node 102 may indicate to the RAN mobile node information such as a dormancy state of the mobile node 102 and/or a data rate at which the mobile node 102 operates. The mobile node 102 may then log into an access network, as shown at block 704. The mobile node may log into any access network through any device, such as the foreign agent 106, a PDSN, or other network devices. The RAN may inform the access network of parameters of the mobile node 102, as shown at block 706. The RAN may indicate any number of parameters and any type of parameters as well, such as for example a data rate of the mobile node 102. The access network may append the parameters onto a message, as shown at block 708, such as a registration request. The parameters may be appended onto any type of message. In addition, the parameters may be appended onto the message in any manner, such as attaching the parameters onto the end of the message. The access network may then send the message to a device (such as home agent 110), on a home network, as shown at block 710. Any network may represent the home network. For example, an IP network may be the home network. The home network may receive the message and send a message reply to the access network, as shown at block 712.

The access network may also send the registration request to the home agent control node 116. The home agent control node 116 within the network 100 may then balance home agent assignments to mobile nodes during call setup. For more information regarding home agent load balancing, reference is made to patent application Ser. No. 10/222,547, filed Aug. 16, 2002, entitled "System and Method for Home Agent Load Balancing," the full disclosure of which is incorporated herein by reference.

In one embodiment, a home agent is selected from multiple home agents in the network 100 by using load information of the mobile nodes. For example, each home agent within the network 100 may include a distributed load information database, which has information of each home agents current load. A home agent may receive a mobile IP registration request message from the interface 104 and determine from its distributed load information database, whether it is the home agent within the network 100 with the smallest amount of load. If so, this home agent will accept the mobile node and establish a call session. If not, this home agent will pass on the mobile IP registration request to another home agent, who follows the same routine.

In another embodiment, the home agent control node 116 may receive the mobile node's mobile IP registration request from the foreign agent 106 and determine which home agent within the network 100 has the least amount of load. The home agent control node 116 may then assign the home agent with the least a mount of load to handle this mobile node.

The home agent control node 116 may balance traffic on the home agent 110 based on a number of calls or based on a number of mobile nodes assigned to the home agent 110. The home agent 110 may be assigned a maximum number of calls or mobile nodes that it can actively support at one time. However, not all mobile nodes operate at the same data rate, therefore when a maximum amount of mobile nodes are assigned to the home agent 110 based on low data rates, more than the maximum amount of traffic that the home agent 110 can handle may be assigned to the home agent 110 if not all of the mobile nodes operate at the low data rates. And if more than the maximum number of mobile nodes become active simultaneously, the home agent 110 may be overloaded and may fail.

In one embodiment, the home agent control node 116 may balance home agent assignments to mobile nodes based on the data rate and dormancy parameters of the mobile nodes. Home agents of the network 100 may inform the home agent control node 116 of data rates of operating mobile nodes (using information received from foreign agents). The home agent control node 116 may then load balance new traffic based on the data rates of the mobile nodes. For example, a 1×EVDO mobile node can be weighted as multiple 1×RTT mobile nodes because the 1×EVDO mobile node may be able to receive at much higher data rates. And since the home agent control node 116 knows the data rate of mobile nodes, the home agent control node 116 may be able to optimally balance traffic rather than estimating traffic of mobile nodes. At any one time, the home agent 110 may not be assigned more than its capacity.

The home agent control node 116 may also load balance traffic based on the dormancy parameter of the mobile node 102 as well.

While the invention has been described in conjunction with presently preferred embodiments of the invention, persons of skill in the art will appreciate that variations may be made without departure from the scope and spirit of the invention. For example, while the foregoing description is presented in terms of tunneling signaling between a foreign agent and a home agent, any type of signaling may be used to transfer information from the foreign agent to the home agent, such as for example any proprietary signaling protocol.

Additionally, typically within the network 100, the mobile node 102 may send information to the interface 104 with the intent that the interface 104 forward this information to the foreign agent 106 upon receipt of the information. However, the interface 104 may at any time send mobile node 102 information to the foreign agent 106 without being prompted by the mobile node 102. Alternatively, the interface 104 may only send the mobile node information to the foreign agent 106 if initiated to do so by the mobile node 102. Similarly, the foreign agent 106 may send this information to the home agent 110 with or without being prompted to do so, and/or during predetermined time intervals possibly to indicate an update dormancy status of the mobile node. Other examples are possible as well.

The true scope and spirit of the present invention is defined by the appended claims, which may be interpreted in light of the foregoing.

We claim:

1. In a network having a mobile node in communication through an access network with a home network, a method comprising:

sending mobile node information from the access network to the home network, wherein the mobile node information at least comprises information selected from the group consisting of a data rate at which the mobile node operates and a dormancy parameter indicating whether the mobile node is active, wherein the dormancy parameter indicates to the home network accounting information for billing purposes.

2. The method of claim 1, wherein sending the mobile node information from the access network to the home network comprises sending the mobile node information from a foreign agent to a home agent.

3. The method of claim 1, wherein sending the mobile node information from the access network to the home network comprises sending a registration request from the access network to the home network, wherein the registration request at least comprises the mobile node information.

4. The method of claim 1, wherein sending the mobile node information from the access network to the home network comprises:

receiving an A-11 message at the access network from a radio access network; and the access network in response, sending a proxy registration request message to the home network, wherein the proxy registration request message at least comprises the mobile node information.

5. The method of claim 1, wherein sending the mobile node information from the access network to the home network comprises sending the mobile node information whenever the data rate at which the mobile node operates changes.

6. The method of claim 1, wherein sending the mobile node information from the access network to the home network comprises sending the mobile node information whenever the mobile node becomes active and whenever the mobile node goes dormant.

7. The method of claim 1, wherein sending the mobile node information from the access network to the home network comprises sending the mobile node information in a message during a call-setup.

8. The method of claim 1, wherein sending the mobile node information from the access network to the home network comprises sending the mobile node information in a message during a call.

9. The method of claim 1, wherein sending the mobile node information from the access network to the home network comprises sending the mobile node information to the home network at predetermined time intervals.

10. The method of claim 1, further comprising receiving at the access network an initiation request from the mobile node, wherein the initiation request allows the access network to send the mobile node information to the home network.

11. The method of claim 1, further comprising receiving at the access network a message from the mobile node, wherein the message at least comprises the mobile node information.

12. The method of claim 1, wherein sending the mobile node information from the access network to the home network comprises sending a proxy registration request from the access network to the home network, wherein the proxy registration request at least comprises the mobile node information.

13. The method of claim 1, wherein sending the mobile node information from the access network to the home network comprises the access network generating a proxy registration request and sending the mobile node information in the proxy registration request using a Mobile Internet Protocol (mobile IP) extension.

14. The method of claim 1, further comprising sending a reply message from the home network to the access network, wherein the reply message indicates a lifetime of the mobile node information.

15. The method of claim 1, wherein sending mobile node information from the access network to the home network comprises sending a data packet message that comprises information selected from the group consisting of a network access identifier, an authentication identifier, the data rate, and the dormancy parameter.

16. A method of transferring session speed and state information between access and home networks comprising:
receiving at an access network data rate and dormancy parameters of a mobile node;
receiving at the access network a first registration request from the mobile node; and
the access network responsively sending a second registration request to a home network, wherein the second registration request at least comprises information selected from the group consisting of the data rate and dormancy parameters of the mobile node, wherein the second registration request comprises a Mobile Internet Protocol (IP) proxy registration request.

17. An access network comprising:
an input interface to receive messages from a mobile node; and
a proxy registration agent to generate and send to a home network a proxy registration message, wherein the proxy registration message at least comprises information selected from the group consisting of a data rate at which the mobile node operates and a dormancy parameter indicating whether the mobile node is active, wherein the proxy registration agent sends the proxy registration message to the home network during a call.

18. The access network of claim 17, wherein the proxy registration agent sends the proxy registration message to the home network during a call-setup.

19. The access network of claim 17, wherein the proxy registration message is a Mobile Internet Protocol (IP) registration message.

20. A method for assigning home agents in a mobile Internet Protocol (IP) network, the method comprising:
receiving at an access network data rate and dormancy parameters of a mobile node;
sending a proxy registration request from the access network to a home agent control node, wherein the proxy registration request at least comprises information selected from the group consisting of the data rate and dormancy parameters of the mobile node; and
the home agent control node assigning a home agent from a plurality of home agents in the mobile IP network to the mobile node based at least in part on the mobile node information, wherein assigning the home agent from the plurality of home agents in the mobile IP network to the mobile node based at least in part on the mobile node information comprises determining which home agent of the plurality of home agents within the mobile IP network has a least amount of load and assigning the home agent with the least amount of load to the mobile node.

21. The method of claim 20, further comprising sending the proxy registration request from the access network to the home agent.

22. The method of claim 21, further comprising the home agent determining its current load and accepting assignment of the mobile node if the current load is less than a load of each of the plurality of home agents in the mobile IP network.

23. The method of claim 22, further comprising the home agent sending the proxy registration request to one of the plurality of home agents within the mobile IP network if its current load is more than the load of any of the plurality of home agents in the mobile IP network.

* * * * *